March 1, 1932. G. E. SMITH 1,847,414
METHOD OF MAKING WHEELS
Original Filed March 9, 1928 2 Sheets-Sheet 1
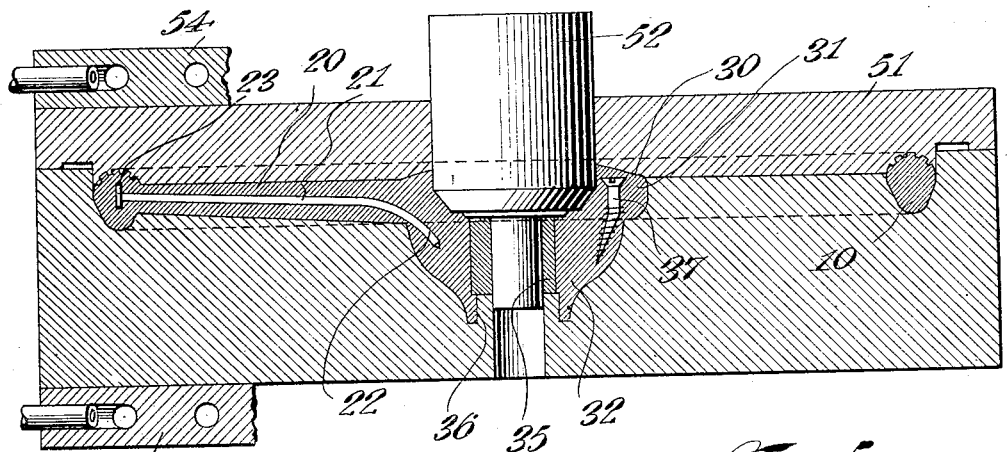
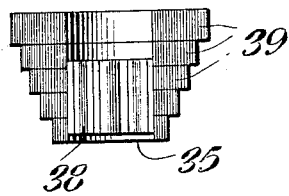
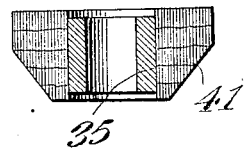
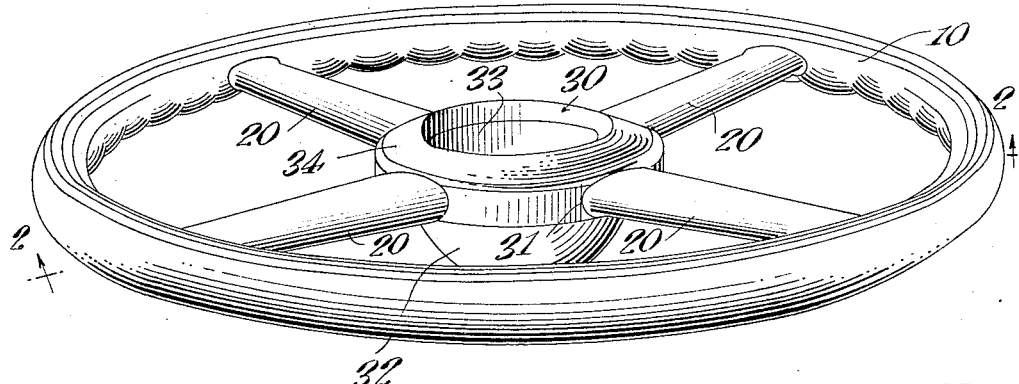
INVENTOR
Grant E. Smith.
BY his ATTORNEYS
Emery, Booth, Varney & Whittemore March 1, 1932.   G. E. SMITH   1,847,414
METHOD OF MAKING WHEELS
Original Filed March 9, 1928   2 Sheets-Sheet 2
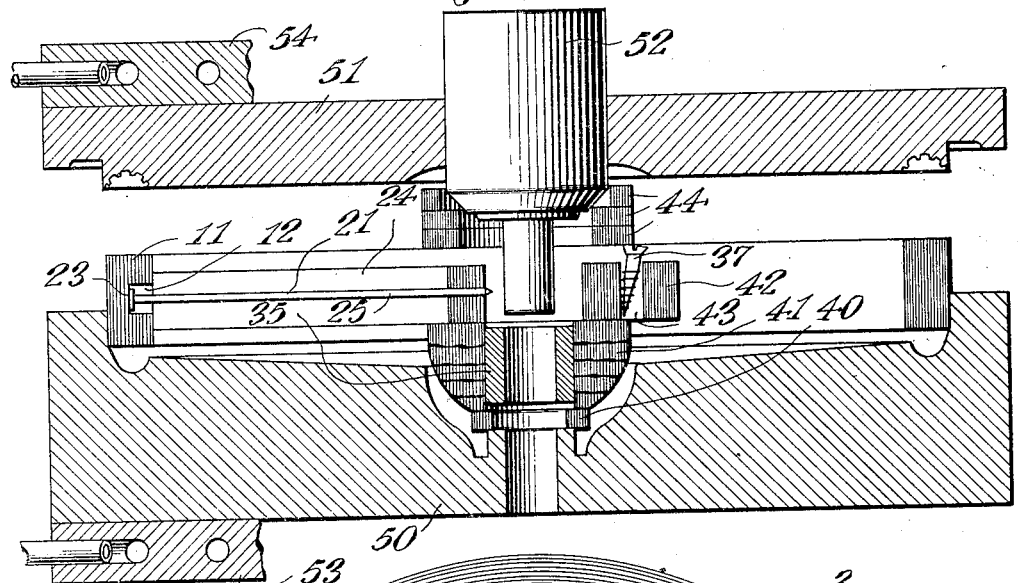
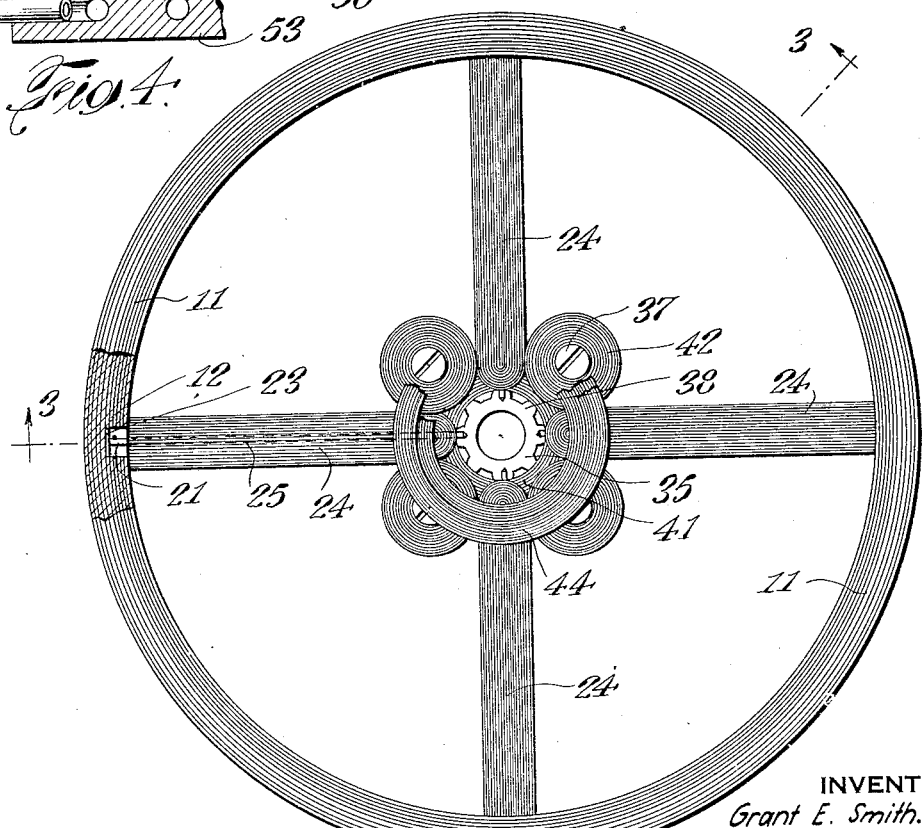
INVENTOR
Grant E. Smith.
BY his ATTORNEYS
Emery, Booth, Varney & Whittemore Patented Mar. 1, 1932

1,847,414

UNITED STATES PATENT OFFICE

GRANT E. SMITH, OF POUGHKEEPSIE, NEW YORK, ASSIGNOR TO POUVAILSMITH CORPORATION, OF POUGHKEEPSIE, NEW YORK, A CORPORATION OF NEW YORK

METHOD OF MAKING WHEELS

Original application filed March 9, 1928, Serial No. 260,295. Divided and this application filed June 11, 1931. Serial No. 543,588.

The present invention relates to wheels and to the manufacture thereof and has for an object the provision of a strong, durable and attractive wheel and the economical and expeditious manufacture of the same. Inasmuch as the invention has been particularly developed in connection with the manufacture of steering wheels for automobiles such an embodiment has been selected for illustration and description herein.

The invention in some aspects concerns the manufacture of wheels wherein the rim, spokes and hub are made of moldable material, for example, of blanks of fibrous material which are assembled and subsequently compressed in molds under heat and pressure to form an integral wheel. This provides a quick and economical method of manufacture, the blanks being formed of relatively inexpensive material and the operations being capable of execution by relatively unskilled operatives.

The invention in other aspects is particularly directed to the provision of a molded wheel wherein the hub is formed with an axial bore or recess in the hub for the reception of operating mechanism and an integral axial extension which may carry a bushing or other means for attaching the wheel to a shaft; and wherein reinforcing members are provided at points requiring additional strength; as for example between the rim and spokes, between the spokes and hub, and between the hub and its axial extension.

The present invention is a division from my co-pending application Serial Number 260,295, filed March 9, 1928.

The enumerated and further objects of the invention will be better understood from the description of an illustrative embodiment thereof, as shown in the accompanying drawings, in which:

Fig. 1 is a perspective view of a completed wheel made in accordance with the present invention;

Fig. 2 is a sectional view of the wheel in position in the mold in which it has been formed, the section of the wheel being taken on the line 2—2 of Fig. 1;

Fig. 3 is a similar sectional view showing a complete wheel blank assembly in the mold previous to the compressing and molding operation;

Fig. 4 is a plan view of the blank assembly before molding, parts being broken away;

Fig. 5 is a section of a hub extension element partly shaped under pressure; and Fig. 6 is a view of the blank assembly employed in forming the hub extension element.

The wheel, in its completed form, as shown in Figs. 1 and 2, comprises a rim 10, spokes 20 and a hub 30, the hub including a body portion 31 embracing the inner ends of the spokes and a flanged extension 32 axially offset with respect to the inner ends of the spokes. The extension 32 is provided with a metallic bushing 35 for securing the wheel to a shaft, for example a steering post.

If desired, an enlarged bore 33 for the reception of parts appurtenant to the wheel may be formed in the hub on the side opposite the hub extension 32. As illustrated, the bore 33 extends into the hub approximately to the lower edge of the spokes. There may also be an enlarged bore 36 formed in the hub extension 32 below the bushing 35 for the reception of other appurtenant parts, such for example, as the upper end of a tube surrounding the steering shaft carrying the wheel. A metal reinforcing member 21 extends throughout the length of each spoke and at its outer end beyond the end of the spoke so as to be embedded in the rim. Preferably this end is provided with an enlargement 23, the better to secure it within the rim. At its inner end the reinforcing member together with the spoke extends well into the hub and is laterally bent within the hub (as indicated at 22) so as to extend into the hub extension 32.

Between each pair of adjacent spokes another reinforcing member 37 for the hub is provided. In the present instance this reinforcing member is formed as a headed wood screw extending at an angle from the body of the hub into the hub extension. By this construction and reinforcement the hub extension is quite rigidly secured to that portion of the hub about the ends of the spokes and the spokes likewise are securely held to the rim. The wheel, as a whole, will thus be quite rigid and will resist very severe strains tending to rupture it in any direction.

The wheel made according to this invention is preferably compressed and molded to final shape and size from a plurality of partially shaped blanks assembled in a mold. In order that the blanks may more readily conform to the shape of the mold they are made with lateral dimensions approximating corresponding dimensions of the mold and the reduction in size is effected principally in a vertical direction by the convergence of the mold sections. The blanks for the various elements of the wheel are made up largely from paper, preferably a paper of good quality and considerable strength such as kraft paper, impregnated with a suitable adhesive, desirably an adhesive adapted to be cured under heat and pressure, such as a phenol condensation product. A sufficient amount of adhesive may be employed in the paper to cause a surface coating of the same on the wheel or if preferred for this coating the adhesive may be applied in powdered or liquid form to the outer surfaces of the blanks.

The blank assembly for the wheel is shown in Figs. 3 and 4. In Fig. 3 it is shown as placed in the mold before being compressed and molded.

The mold shown may comprise a lower plate 50 and an upper plate 51 with mating depressions together defining the final shape of the wheel when the molds are fully closed. A plunger 52 may be employed to form the bore of the wheel. The mold will also comprise chambered plates 53 and 54 overlying the backs of the mold plates 50 and 51 to provide for circulation of heating or cooling fluid about the mold plates.

Still referring principally to Fig. 3 but occasionally also to Fig. 4, the blanks for the wheel are shown as they are assembled in the mold. First an annular spirally wound paper ring 40 is placed in the bottom of the mold. Upon this a blank section 41 is placed. This blank section 41 is preferably partially pre-formed so as approximately to fit within the mold. The blank 41 and the ring 40 together comprise the hub extension 32 in the final form of the wheel.

The preparation of this blank 41 will be understood by reference to Figs. 5 and 6. In Fig. 5 the bushing 35 provided with external projections 38 (as clearly shown in Fig. 4) is surrounded by a plurality of annular spirally wound coils of paper 39 of increasing outside diameter from bottom to top of the blank. This assembly is placed within a press of the same general shape as that portion of the mold in which the blank is to be placed and compressed under high pressure but without heat into the general shape in which it is shown in Fig. 6, this also being the shape in which it is found in Fig. 3.

Next a rim blank comprising an annular spirally wound paper ring 11 is placed in the mold. This ring has bores 12 formed in its inner side for the reception of the reinforcing members 21 of the spokes. The spoke blanks, comprising vertically laminated paper bars 24 provided with longitudinal bores 25 receiving the reinforcing member 21, are now laid in the mold with their outer ends abutting the inner surface of the rim blank, the ends of the reinforcing members extending into the bores 12 of the rim, and with their inner ends resting upon the top surface of the hub extension blank section 41. Between the inner ends of adjacent pairs of spoke blanks, small spirally wound paper rolls 42 are placed and these rolls together with the inner ends of the spoke blanks form in the completed wheel the principal portions of the body 31 of the hub. The small rolls 42 are provided with axial bores 43 and into these bores the reinforcing members 37 are dropped, the points of the members 37 being inclined as much as permissible toward the interior of the hub. Above the inner ends of the spoke blanks and the coils 42 other annular spirally wound paper coils 44 are placed to complete the hub, preferably forming also in the finished wheel a slightly raised upper annular hub rib 34.

Finally the mold plates are brought toward each other and the core plunger 52 is dropped into position.

The pressure heads of the press are now brought against the mold parts to press the same against the wheel blank assembly with a light pressure. The mold is allowed to absorb heat from the pressure heads and the blank to absorb heat from the mold for a predetermined time, for example for five minutes, until the blank becomes thoroughly heated and then the extreme pressure is applied to close the mold and compress the complete blank to form the wheel as shown in Fig. 2. When the mold is closed and the blank assembly fully compressed, it is cooled while still maintaining the pressure or a part of the pressure.

During the compressing and molding operation the paper or other fibrous material of which the blanks are composed will flow to conform to the shape of the mold and the material of the several blanks of the assembly will flow together into homogeneous integral relation to form unitary structure.

The heat of the mold first softens and makes plastic and adhesive and then, during the compressing operation, the adhesive is cured and hardened. The adhesive material also acts as a lubricant between the mold and the blank and apparently also between the different thicknesses of paper.

The pressure employed may range for example from 500 lbs. to 5000 lbs. per square inch on the wheel depending upon the amount of compression desired, the quality of the material of the blank, the size of the object to be formed and other features characteristic of the material, finish or mold. By such pressure the blank will be reduced to approximately one-half its original volume. The temperature at which the operation is performed may vary considerably. Successful results have been obtained by compressing kraft paper blanks at temperatures which approach 300° F. It is found convenient to heat the mold by steam under a pressure of about 85 lbs. per square inch. The mold may be cooled when the compressing operation is completed by circulating water in the passages through which steam was previously circulated. The preliminary heating of the mold prior to the insertion of a blank may be accomplished in any suitable manner. During the compressing operation the inner end of the reinforcing member 21 in each of the spokes will be bent down as shown at 22 and firmly embedded in the hub extension 32. The reinforcing members 37 for the spokes will also be either forced inward at a uniform angle throughout their length or bent inward at their lower ends as shown in Fig. 2 to extend into the hub extension from the hub proper.

Thus an exceptionally strong fabricated structure is provided both by reason of the compressing and molding which increases the density of the material and increases the co-ordination of the fibres and by reason of the embedding in the wheel in places wherein it is normally weak, reinforcing members which effectually strengthen the wheel at these points. By the term "fabricated structure" is implied one built up of several parts connected with one another to form a completed structure.

The foregoing description of a particular embodiment is intended merely for illustration and not as defining the limits of the invention. The particular blank assembly and the particular material specified may be departed from as desired within the spirit of the invention as defined in the appended claims.

What I claim is:

1. The method of manufacturing a wheel which comprises assembling in a mold, spoke blanks comprising vertical laminations of sheet fibrous material, a hub blank comprising an annular paper roll of spirally wound sheet fibrous material and a hub extension blank comprising annular spirally wound paper rolls compressed about a bushing, and a rim blank of fibrous material, longitudinal metal reinforcing members in said spokes extending into the rim at one end and into the hub at the other end, and compressing the whole under heat and pressure to form the wheel, the metal extensions in the spokes being bent by the pressure exerted to extend from the inner ends of the spokes into the hub extension.

2. The method of making a wheel which includes assembling in a mold, spoke blanks of sheet fibrous material, a rim blank of sheet fibrous material, a hub blank comprising a roll of sheet fibrous material arranged on edge, and a hub extension blank pre-compressed of rolls of sheet fibrous material arranged on edge into approximate shape of the mold, all of said fibrous blanks being impregnated with an adhesive adapted to be cured under heat and pressure and compressing the whole under heat and pressure and molding the same to form the wheel.

3. The method of making a spider which comprises assembling in a mold, spoke blanks comprising sheets of fibrous material in vertical laminations, and a hub blank comprising annular rolls of sheet fibrous material in vertical laminations, and rolls of sheet fibrous material between each pair of adjacent spokes, placing metal reinforcing members within each of said last mentioned rolls and compressing the whole under heat and pressure to form the spider and embed said reinforcing members in said hub.

4. The method of making a spider which comprises assembling in a mold, spoke blanks of fibrous material and between the inner ends of each adjacent pair of spoke blanks a roll of fibrous material and compressing the whole under heat and pressure to form the spider.

5. The method of making a spider which includes assembling in a mold, spoke blanks comprising fibrous material, a hub blank comprising annular rolls of sheet fibrous material, smaller rolls of said fibrous material between each adjacent pair of spokes, a hub extension blank pre-compressed to approximately the shape of the mold of annular rolls of sheet fibrous material, inserting in each of said interspoke rolls a metal reinforcing member and compressing the whole under heat and pressure to form the spider and embed said metal reinforcing members in the hub and hub extension.

6. The method of making a wheel which comprises assembling in a mold, a rim blank of vertically laminated paper, spoke blanks of vertically laminated paper provided with longitudinal metal reinforcing members extending into the rim at the outer end, a hub extension blank comprising a lower annular roll of vertically laminated paper, and a hub blank section above said annular roll, the hub blank section being pre-formed to approximate size of the mold of vertically laminated rolls of paper compressed about a metal bushing, placing between the inner ends of each pair of spokes vertically laminated paper rolls, inserting within each of said interspoke rolls a roughened metal reinforcing member, placing above said spokes and interspoke rolls other annular rolls of vertically laminated paper and compressing the whole under heat and pressure to approximately one-half its original volume to form the wheel, the pressure exerted serving to bend the inner ends of the spoke reinforcing members into the hub and hub extension and embed the interspoke reinforcing members in the hub and hub extension.

7. The method of making a wheel with a large hub cavity at one end of the hub and a hub extension therebelow of molded material and light radial reinforcing means which comprises compressing the wheel above the inner ends of the radial reinforcing means to bend the same down as the wheel shrinks.

8. The method of making a wheel spider which comprises assembling spoke blanks of moldable material between rolls of moldable material on all sides thereof at the hub, and molding the same under pressure to form an integral hub unit.

In testimony whereof, I have signed my name to this specification this 8th day of June, 1931.

GRANT E. SMITH.

CERTIFICATE OF CORRECTION.

Patent No. 1,847,414.  Granted March 1, 1932, to

GRANT E. SMITH.

It is hereby certified that error appears in the printed specification of the above numbered patent requiring correction as follows: Page 2, line 122, before "unitary" insert the article and word a rigid; and that the said Letters Patent should be read with this correction therein that the same may conform to the record of the case in the Patent Office.

Signed and sealed this 5th day of April, A. D. 1932.

(Seal)

M. J. Moore,
Acting Commissioner of Patents.